Jan. 24, 1933. J. R. BLACKHALL 1,895,368
TRUCK
Filed May 23, 1927 5 Sheets-Sheet 1
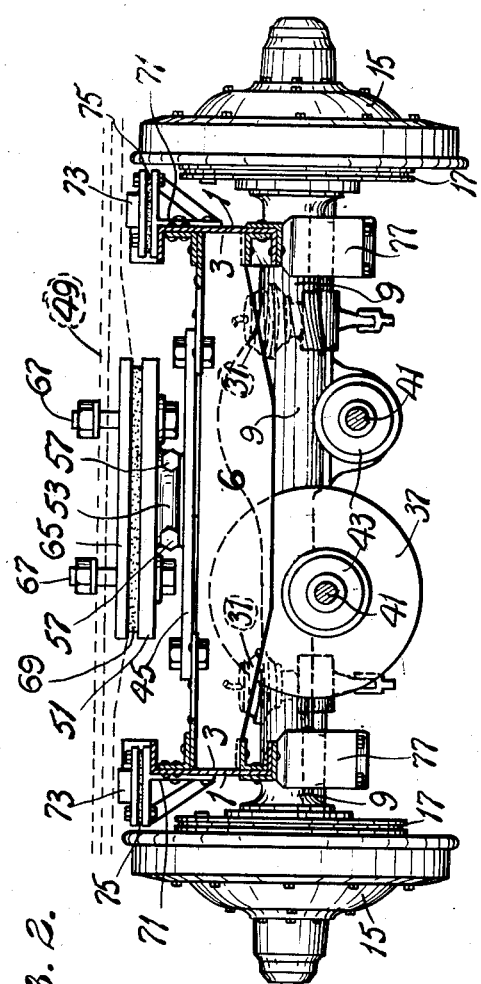
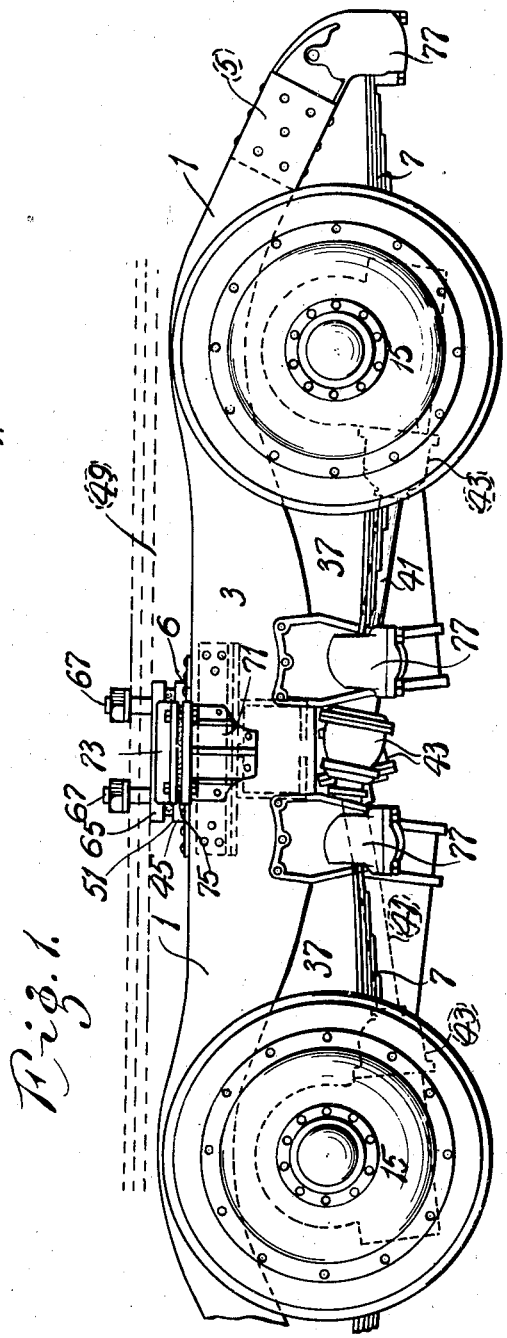

Jan. 24, 1933.    J. R. BLACKHALL    1,895,368
TRUCK
Filed May 23, 1927    5 Sheets-Sheet 2
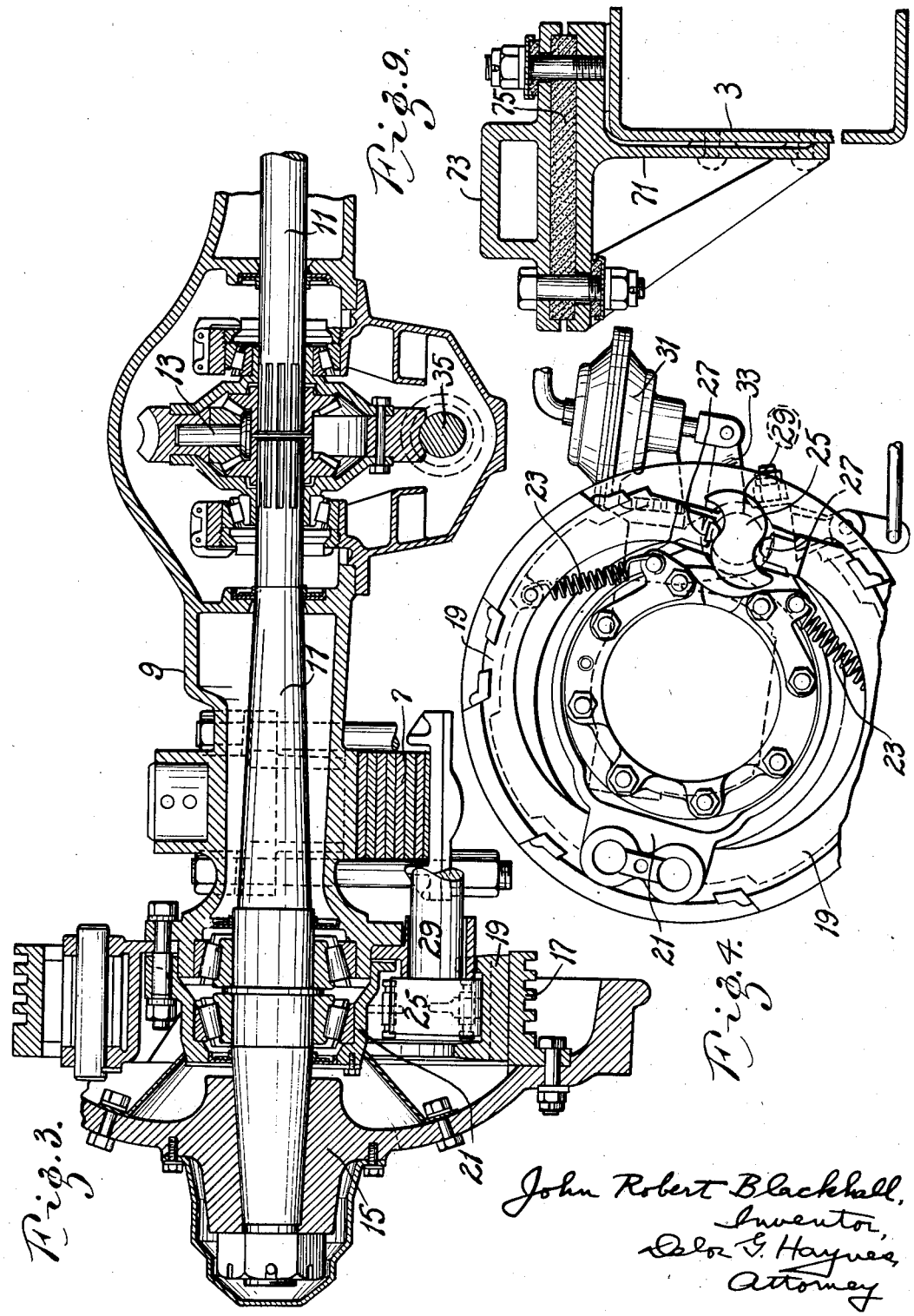

Jan. 24, 1933. J. R. BLACKHALL 1,895,368
TRUCK
Filed May 23, 1927 5 Sheets-Sheet 3
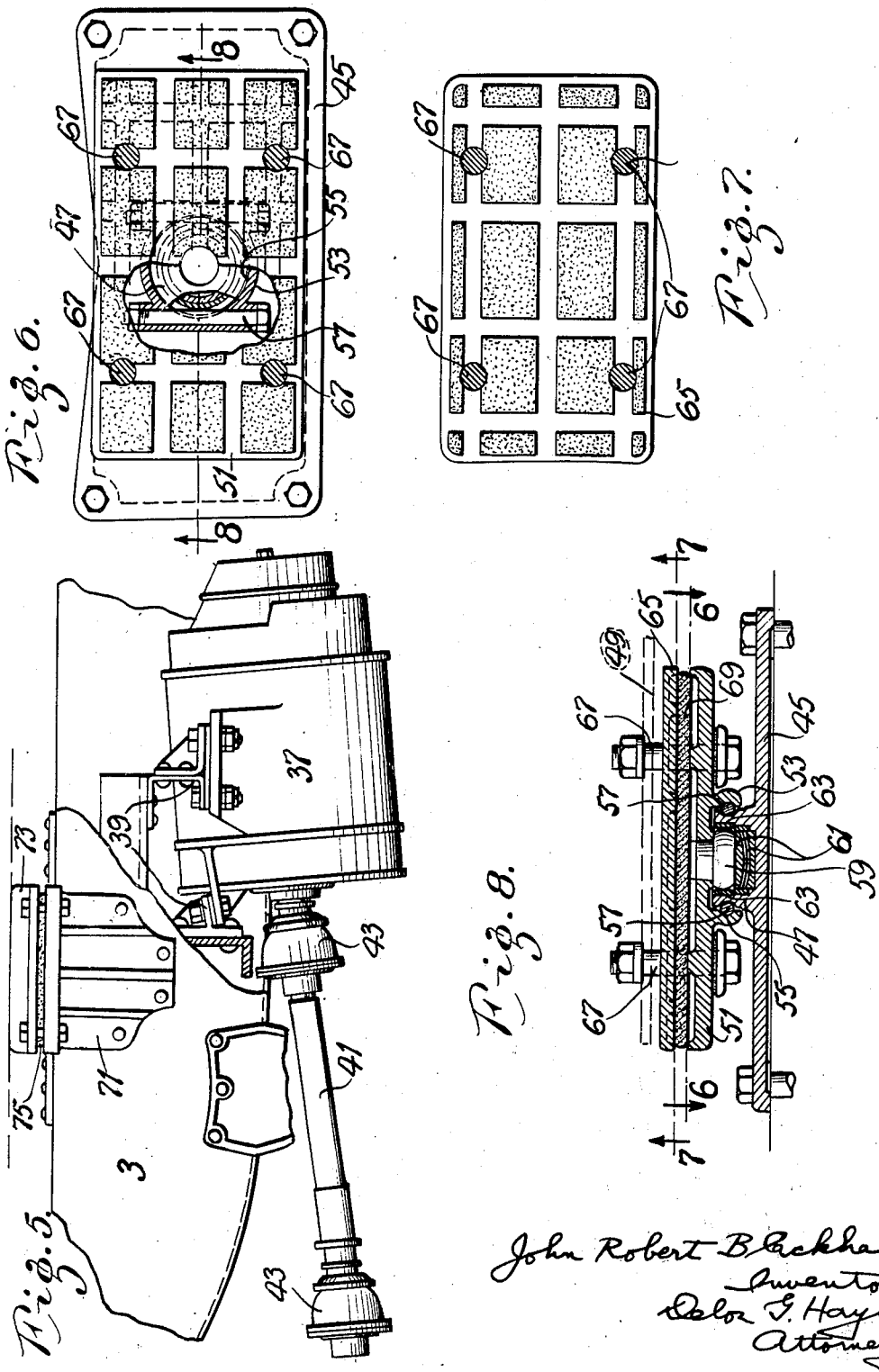

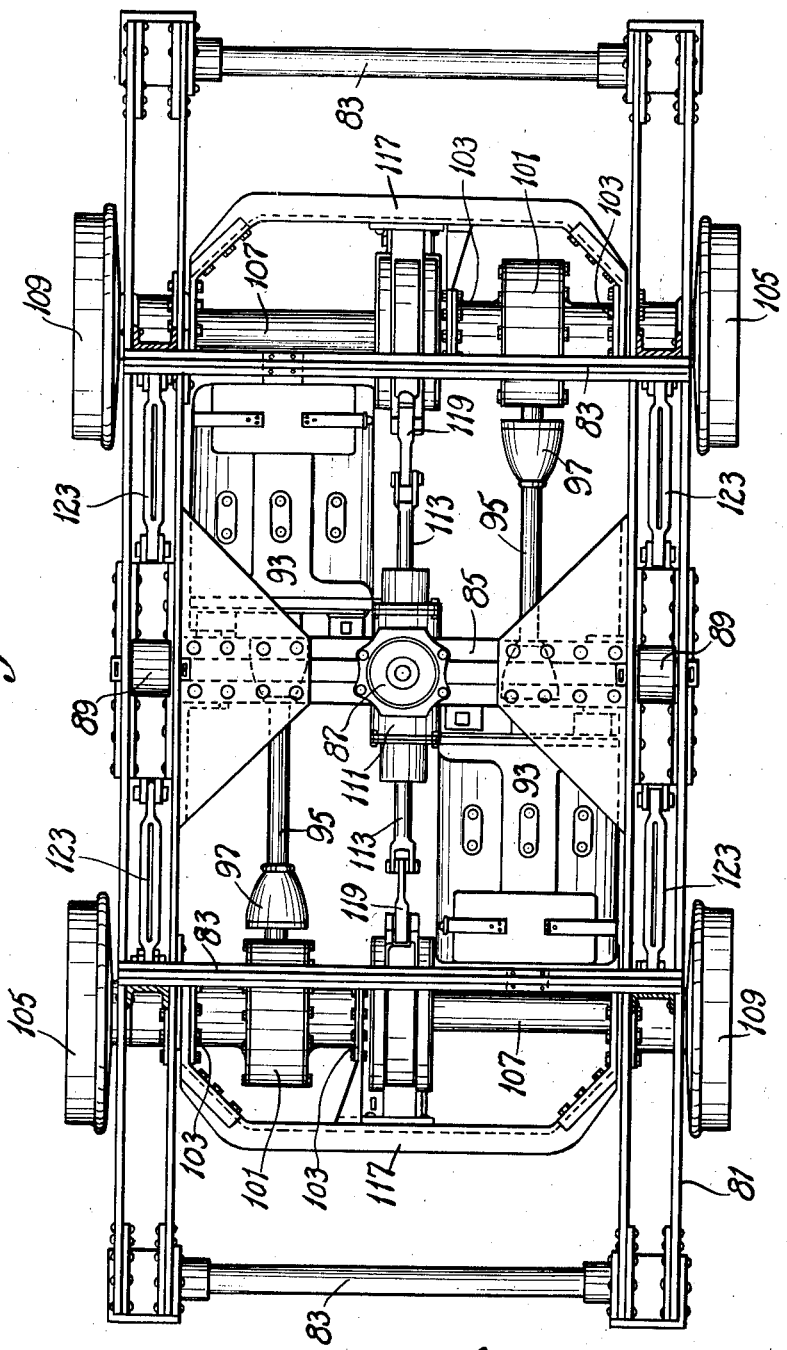

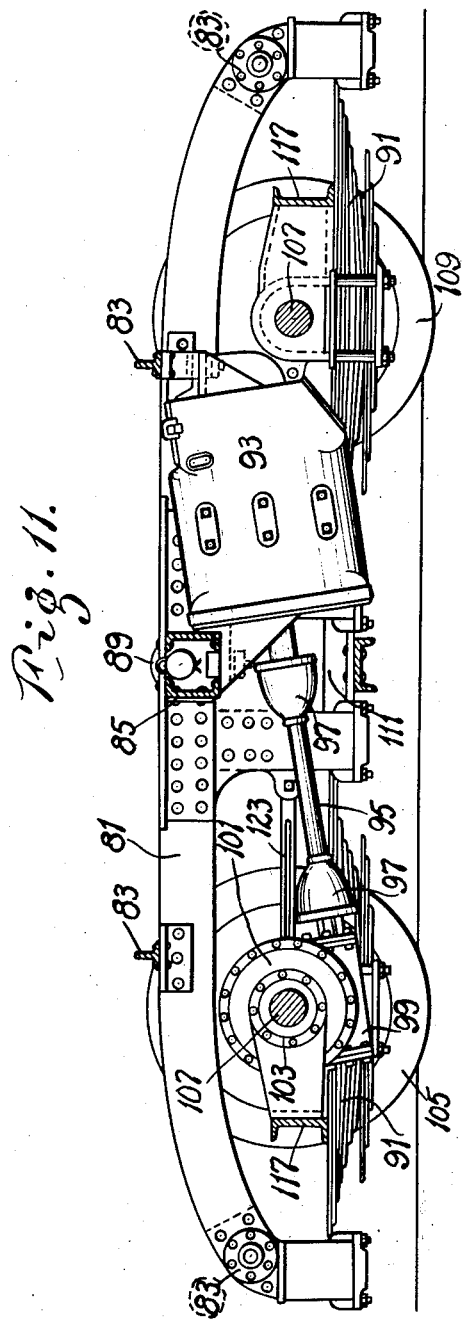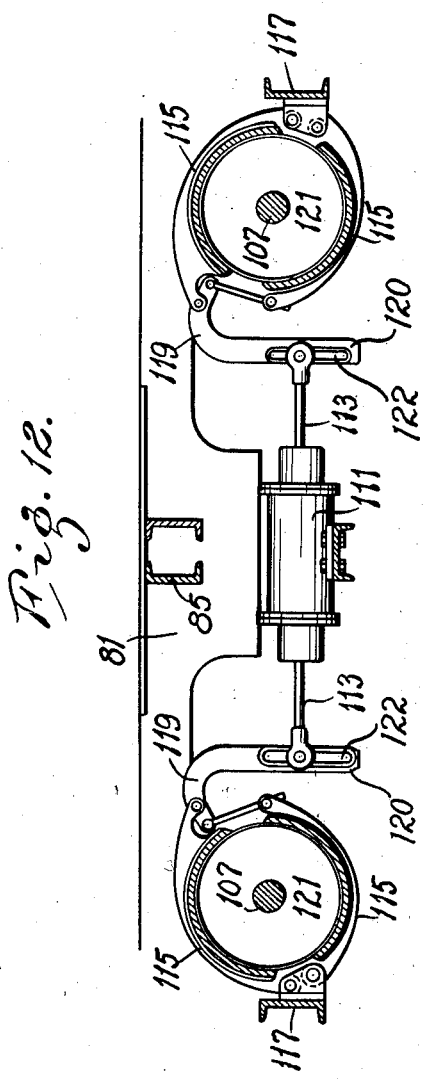

Patented Jan. 24, 1933

1,895,368

UNITED STATES PATENT OFFICE

JOHN ROBERT BLACKHALL, OF JOLIET, ILLINOIS

TRUCK

Application filed May 23, 1927. Serial No. 193,672.

This invention relates to trucks and with regard to certain more specific features, to railway trucks for electric vehicles.

Among the several objects of the invention may be noted the provision of a street railway truck adapted to materially lessen noise, reduce weight and provide a more comfortable vehicle; the provision of an improved railway truck of the class described having a fixed bolster, whereby complication in construction is avoided and the multiplicity of parts reduced and at the same time riding qualities improved. Other objects will be in part obvious and in part pointed out hereinafter.

The invention accordingly comprises the elements and combination of elements, features of construction, and arrangements of parts which will be exemplified in the structure hereinafter described, and the scope of the application of which will be indicated in the following claims.

In the accompanying drawings, in which are illustrated two of various possible embodiments of the invention, Fig. 1 is a side elevation of the preferred form of truck, showing the body partially outlined in dotted lines;

Fig. 2 is an end elevation of said truck, parts being broken away;

Fig. 3 is a cross-section of one axle and a driving wheel of said truck, showing a differential worm drive;

Fig. 4 is a side elevation of an internal expanding brake drum;

Fig. 5 is a fragmentary side elevation showing one form of motor suspension, parts being broken away;

Fig. 6 is a cross section taken on line 6—6 of Fig. 8 and shows a portion of a fixed bolster king-pin construction, parts being broken away;

Fig. 7 is a view taken on line 7—7 of Fig. 8;

Fig. 8 is a vertical section taken on line 8—8 of Fig. 6;

Fig. 9 is an enlarged side elevation of a side bearing used in connection with the fixed-bolster construction;

Fig. 10 is a plan view of an alternative form of truck;

Fig. 11 is a side elevation of the alternative form; and

Fig. 12 is a diagrammatic side elevation showing the brake rigging of the alternative form.

Corresponding reference characters indicate corresponding parts throughout the several views of the drawings.

Referring now more particularly to Figs. 1 and 2, there is illustrated at numeral 1 a truck frame, including side rails 3 and end members 5. Formed laterally across the center of the frame 1 is a fixed bolster 6, serving the purposes to be described.

The frame 1 carries two pairs of oppositely disposed springs 7, centrally attached to axles or axle housings 9. The springs 7 are underslung with respect to the axle housings 9 (see also Fig. 3). The side rails or frames 3 are kicked up over said axles 9 (Figs. 1 and 11).

The axle housings 9 each carry, in roller bearings, a pair of drive shafts 11 driven by a differential driving system 13, the shafts being connected to oppositely disposed wheels 15. The wheels 15 are made of pressed steel and each carry a brake drum 17 surrounding a pair of internally expanding brake shoes 19, the latter carried pivotally in sections on said axle housing 9.

The brake drum mounting is shown clearly in Figs. 3 and 4, wherein is shown a supporting casting 21 for pivoting the split shoes 19 on the housing 9 and for receiving the reaction of springs 23 for normally holding the shoes inwardly away from the drum 17. This support 21 also rotatably supports a cam 25, operable when rotated, to split the shoes 19 apart. Hardened pieces 27 on the shoes 19 are adapted to reduce wear.

Rotation of the shaft 29, operating the cam 25, is accomplished by means of the functioning of a diaphragm valve 31 on an arm 33 attached to said shaft 29. The diaphragm valve is pneumatically operated in the conventional manner. By means of this construction, there is provided an exceedingly noiseless brake rigging which is more positive in its braking action than the previous types used on street railway trucks. The noiselessness is due to the absence of loose-jointed linkages and the improved action is due to the increased braking area obtained by the substantially concentric shoes 19.

Referring again to the differentials 13, it will be noted that they are driven by a worm and wheel combination 35. The worm drive is used because it is particularly adaptable for low gear ratios, whereby a driving motor of increased speed and lighter weight for the same power may be used. The particular configuration of the present truck facilitates the application of the high speed motor and attendant worm reduction gear.

The differential is advantageous, both on curved and straight tracks. Its advantages on curved track are that it permits increased speed of the wheel on the outer curve and/or decreased speed of the wheel on the inner curve, whereby wear on the wheel treads and the track is reduced.

In the case of straight track travel, it has been found that sooner or later one or more wheels of a set become smaller, due to differences in the hardness of the metal composing the wheels. Ordinarily, in the case of a non-differential axle, if one wheel of a leading set became smaller, the truck would nose to one side of the track and thereby wear off the flange of the foremost wheel. By introducing a differential system on each axle, this difficulty is overcome, because the differential permits the wheel which is wearing smaller to slightly increase its speed of rotation to prevent the nosing action.

Figs. 1, 2 and 5 illustrate the modes of driving the axles from the motor 37 and also the motor suspension. Each motor 37 is suspended on opposite sides and opposite ends of the fixed bolster 6, that is, the motors 37 are placed in diagonally opposite quadrants on the truck. They are nested. The said arrangement is also shown in plan in the modified form of Fig. 10. Each motor (Fig. 5) may be suspended by means of a three-point support 39 on the frame 1 and bolster. Fig. 5 shows one form of mounting which may be any one of several types. For convenience corresponding reference numerals are used in the Fig. 5 form. The driving quill of each motor is coupled to its respective worm combination 35 by means of a drive shaft 41, including the conventional universal joints 43. It will be seen that this arrangement provides driving torque at each wheel and at the same time permits of a reduced spread of parts, because of the staggered or nested arrangement of the motors and their drive shafts.

The motors, unlike previous motors, are mounted on the truck body and not on the driving axles. This means that the unsprung weight of the truck is reduced, thereby increasing the life of the motor parts. At the same time, the particular arrangement permits of the use of the worm and wheel combinations referred to and hence a greater speed reduction may be maintained. This means that the motors can run at a higher speed with consequent reduction in weight.

Referring now to Figs. 1, 2 and 6 to 8, the fixed bolster construction will be described. The bolster 6 is rigidly connected to the side rails 3. It carries on its upper surface a center bearing support 45 with which is formed a central pocket 47 retaining thrust bearing members 61.

The center bearing for the car body 49 (the body being shown in dotted lines) comprises a lower plate 51 having a downwardly projecting cup 53 which loosely engages the outside of said pocket 47. The pocket 47 is annularly grooved at a region 55 and the cup 53 is so formed (see Fig. 6) as to receive through bolts 57, adapted to pass through a portion of the space at the grooved region 55. By this means the lower plate 51 is locked to the support 45 but relative rotative motion is permitted.

The lower plate 51 is provided with a projecting bearing piece 59 which rests on the oiled bearings 61 in said pocket 47. The piece 59 has a rounded shape, whereby some rocking movement is permitted against a side bearing 63. The rocking movement is accommodated by the use of a spherical construction between the plurality of the bearings 61 so that they engage each other at a spherical surface. It is to be understood that the bolts 57 pass loosely through the groove at 55.

The upper surface of the lower plate 51 is recessed in the pattern illustrated in Fig. 6. This lower plate 51 is adapted to cooperate with an upper bearing plate 65, this latter plate being recessed on its lower surface with the pattern illustrated in Fig. 7. It will be noted that the recessed patterns are so arranged that the low and high spots are arranged alternately so that they do not match (see the fragmentary dotted lines in Fig. 6).

The plates 51 and 65 are adapted to be bolted together and to the car body 49 by means of bolts 67. A pad of rubber 69 is interposed between the plates 51 and 65 before assembly, thereby providing a springing action to absorb the vibrations of smaller amplitude. The purpose of the staggered recesses in the respective plates is to provide a place for the rubber of the pad 69 to "flow" under increased pressures, thereby making it effective as a spring. Figs. 6 and 7 indicate the rubber as having been pressed into the recesses.

In Fig. 9 is illustrated the preferred form of side bearing used herein. Each bearing (two being used) comprises a laterally arranged support 71 riveted to its side member and carrying bolted to its upper surface the side bearing proper 73. Between the side bearing or upper member 73 and the support or lower member 71 is provided a rubber pad 75. The bearing 73 is closely juxtaposed to the outboard regions of the car body so that a slight rocking action on the center bearing 45 will result in contact between the car body and a side bearing 73. The rubber 75 eliminates any shock of impact.

From the above, it will be seen that the car body is supported on a fixed bolster and does not sway nor roll with the usual wave motion. On the other hand, it is well sprung on the springs 7, without possibility of undesirable side sway and at the same time, all minor high-frequency vibrations and shocks are absorbed by the rubber pads.

Shock and noise are further reduced by cushioning the ends of the semi-elliptical springs 7 within rubber pads located inside of the shackles 77 which holds said spring to the frame 1.

In Figs. 10 to 12 is shown a modified form of the invention. In this modification there is provided a truck frame 81 laterally braced by cross members 83 and also having a fixed bolster 85. The bolster 85 carries a center bearing 87 which pivotally carries the car body, the latter resting on roller side bearings 89 at the sides of said fixed bolster 85. In this case the advantages of the fixed bolster and side bearings are attained, without the introduction of rubber padding, the construction depending for ease of riding upon semi-elliptical springs 91 arranged as in the preferred form, that is, underslung.

The driving motors 93 are placed in the diagonal quadrant arrangement described with regard to the first modification, that is they are staggered or nested. The motors are suspended from the members 83 and 85, as shown in Fig. 11. Their drive shafts 95 (including the usual universal joints 97) are coupled to worm gear reducers 99 driving non-differential gears within housings 101.

The housings 101 have a novel arrangement. They are each bolted at points 103 near a corner of the frame 81. Each housing rotatably carries the complete axle arrangement for one of the diagonally arranged wheels 105 and rotatably supports one end of the other longer axle 107 (exposed) for one of the other diagonally arranged wheels 109. The outer ends of the axles 107 are borne in bearings on the frame 81. Both axles for each set of driving wheels 105 are flanged and bolted together or otherwise fastened at the bevel drive within the respective housing 101, so that each set of axles function as one without a differential action. The driving action from the motors 93 is evident from the foregoing.

The brake rigging for this alternate form is centrally arranged and is shown more particularly in Figs. 10 and 12. This rigging comprises a central air cylinder 111 held to the frame 81 and adapted to propel oppositely moving piston rods 113. The rods 113 function to clamp shut a pair of brake shoes 115 pivotally held to beams 117, the latter connected to the axles 107. The rods 113 transmit their movement to the shoes 115 by way of linkages 119.

Reference to Fig. 12 shows that the lever arm 120 of each linkage 119 (fastened to the brake shoes 115, which shoes move with the axle 107) is provided with a slot 122, which permits relative vertical movement of the operative end of the piston rod 113. The rods 113 are movable with the cylinder, which cylinder moves with the truck frame relative to the axles 107 and arms 120. The relative movement is due to the springs 91.

Hence, the slot 122 permits of a variable leverage by the rods 113 on the brake rigging. As the truck is loaded, the leverage increases, thereby making the braking more effective with greater loads. Hence a practically constant rate of deceleration may be obtained and expected under all load conditions with a given setting of the air brake handle. The safety in operation is thus increased as the operator has no changeable braking conditions to meet. It is evident that a brake rigging of or similar to that of the alternate form of Figs. 10 to 12 may be applied to the construction of Figs. 1 and 2, that is, one having a variable leverage. The brake shoes 115, in Figs. 10 to 12, operate on brake drums 121 fastened directly to the axles 107. The drums may be fastened directly to the wheels by suitably shifting the position of the rigging.

This alternate form of truck embodies the compact arrangement described with regard to the previous form and has the easy riding qualities because of the fixed bolster and springs 91. Braces 123 are employed to transmit the reactions of the driving axles to the frame 81.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. The railway truck comprising a frame, a plurality of driving axles, spring supporting means joining the axles and said frame, driving motors diagonally arranged on said frame in the region of opposite ends of opposite axles, driving means joining each of said motors in driving arrangement with the alternate regions of opposite ends of opposite axles, said driving means including a worm and wheel drive on each axle.

2. The railway truck comprising a frame, a plurality of driving axles mounted on wheels, spring supporting means joining the axles and said frame, driving motors diagonally arranged on said frame in the region of opposite ends of opposite axles, driving means joining each of said motors in driving arrangement with the alternate regions of opposite ends of opposite axles, said driving means including a differential gear on each axle and pneumatic braking means operable directly on each of said wheels.

3. The railway truck comprising a frame, two driving axles, spring supporting means joining the axles and said frame, a fixed bolster on the frame for supporting a car body, driving motors for said axles mounted on said frame in diagonal quadrants taken with respect to said bolster and driving means joining each of said motors in driving arrangement with an axle in regions located in quadrants opposite said first-named quadrants and worm and wheel combinations located in said driving arrangements.

4. The railway truck comprising a fixed bolster, a member rigidly supported thereon, a swiveling member supported by said rigid member, a spherical bearing between the swiveling and rigid members and means permitting relative rotation but preventing separation, a second member held to said swiveling member and to a car body and resilient means between the second member and said swiveling member.

5. A two-axle truck comprising a frame, two motors arranged on opposite sides of the longitudinal and transverse center lines thereof, and a worm drive transmission between said motors and said axles respectively, the worm shaft of each axle being below said axle and in substantial alinement with its motor shaft.

6. A two-axle truck comprising a frame, two motors arranged on opposite sides of the longitudinal and transverse center lines thereof, and worm drive transmission between said motors and said axles respectively, the worm shafts being below said axles and inclining upwardly and inwardly, and the motor shafts being arranged in substantial alinement with their worm shafts.

7. A two-axle truck comprising a frame, two motors arranged on opposite sides of the longitudinal and transverse center lines thereof with their inner ends near such transverse center line and with their axes inclining downwardly from their outer ends and worm drive transmission between said motors and said axles respectively, the worm shaft of each axle being below said axle and normally in substantial alinement with its motor shaft.

8. A motor truck for street cars comprising driving axles, side frames kicked up over said axles, a bolster rigidly connecting the middle portions of said side frames, cross beams mounted on said side frames adjacent to said axles, two motors supported from said bolster and the respective cross beams with their cross beam ends higher than their bolster ends, and a worm drive mechanism connecting the respective motors with the axles that are more distant therefrom respectively, each worm shaft being below its axle and in substantial alinement with the corresponding motor shaft.

9. A two-axle truck comprising side frames, a bolster rigidly connecting said side frames, cross-beams rigidly connecting said side frames on opposite sides of said bolster, two motors arranged on opposite sides of said bolster and the longitudinal center line of said truck, a worm drive transmission between said motors and said axles, respectively, the worm shafts being below said axles and inclining upwardly and inwardly, and the motor shafts being arranged in substantial alinement with their worm shafts, and brackets secured to said bolster and said cross-beams, respectively, and to the adjacent end portions of said motors on opposite sides thereof.

In testimony whereof, I have signed my name to this specification this 16th day of May, 1927.

JOHN ROBERT BLACKHALL.